Dec. 5, 1950  E. T. DUNCAN  2,533,000
WINDSHIELD DEICING APPARATUS
Filed April 2, 1948
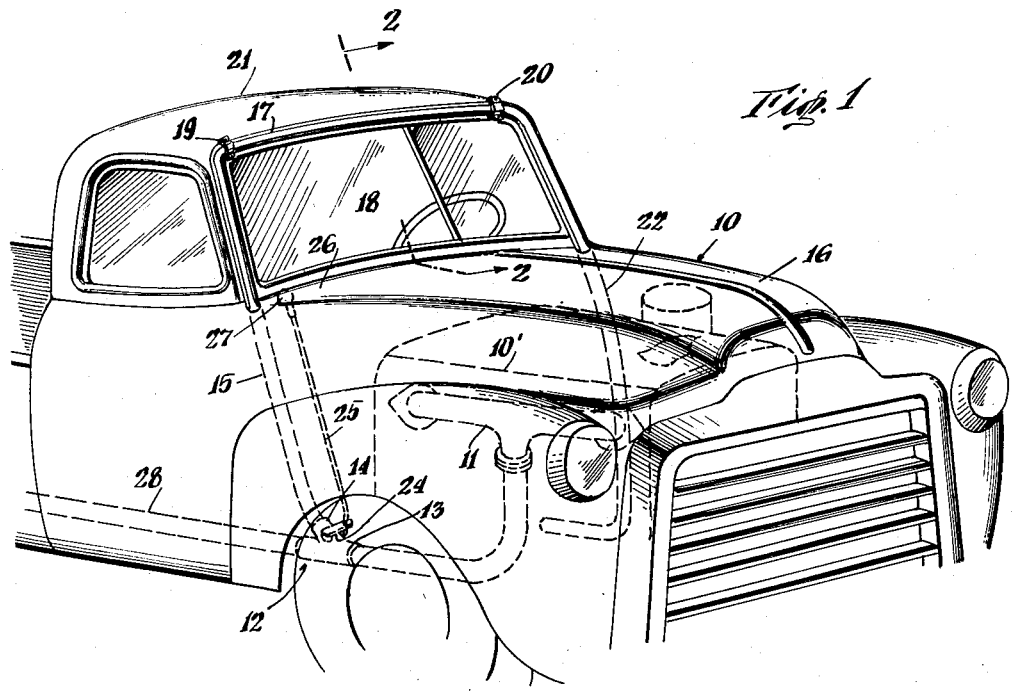
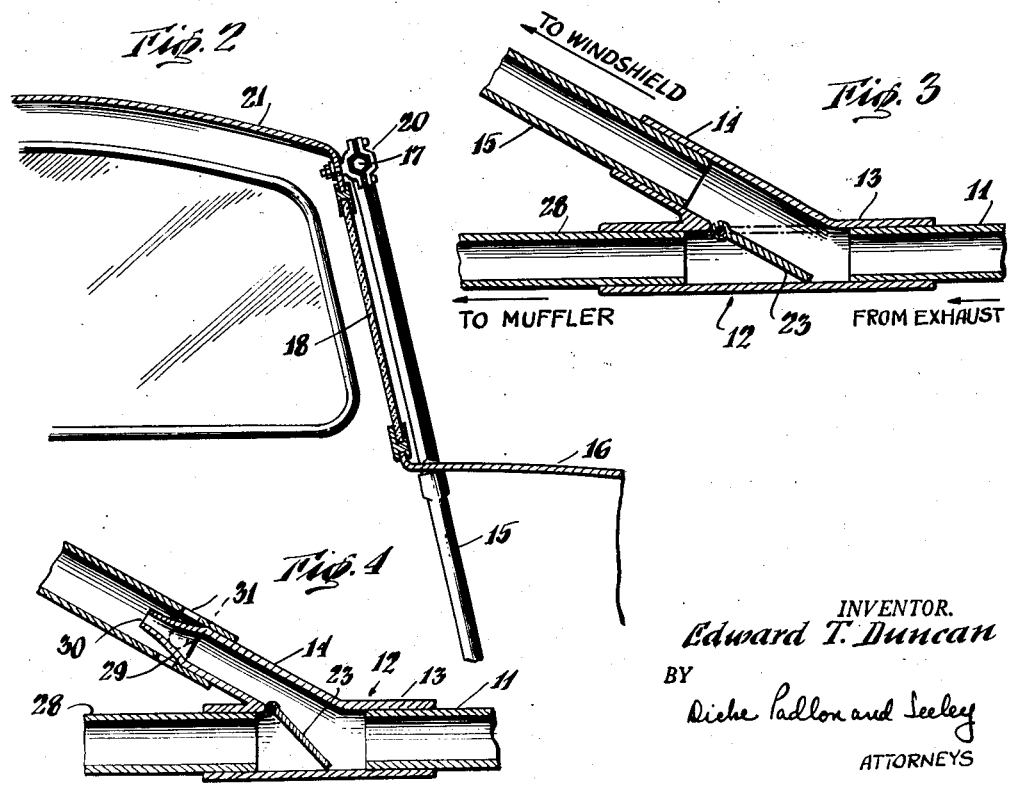
INVENTOR.
Edward T. Duncan
BY
*Dicke Padlon and Seeley*
ATTORNEYS Patented Dec. 5, 1950

2,533,000

UNITED STATES PATENT OFFICE 2,533,000

WINDSHIELD DEICING APPARATUS

Edward T. Duncan, Jacksonville, Ill.

Application April 2, 1948, Serial No. 18,533

1 Claim. (Cl. 20—40.5)

This invention relates to a windshield deicing apparatus and, more particularly, to apparatus adapted to utilize the exhaust gas from an engine whereby the heat of said gas is utilized to warm the windshield area of an automotive vehicle so as to prevent the formation of ice or sleet on the windshield of said vehicle.

During the winter season, when the hazards of driving automotive and like vehicles are increased by the formation of ice or sleet on the windshield of said vehicles, it is oftentimes necessary either to drive the vehicle very slowly or to stop driving and wipe the windshield so as to keep the windshield open for a view of the highway on which the vehicle is traveling.

With the above disadvantages in view, it is one of the objects of my invention to provide a system of deicing windshields of automotive vehicles such as cars, aeroplanes, trains and other movable units containing windshields by utilizing some of the spent energy of the vehicle.

Another object of this invention is to provide means for continually preventing the formation of ice or sleet on the windshields of moving vehicles and the like.

One other object of the invention is to provide controlled conduit means in connection with the exhaust system of an engine of a vehicle and the like and to utilize the energy coming off from said engine to warm the windshield area of a vehicle.

Still another object of the invention is to provide an economic, easily installable and operable deicing apparatus for use in the windshield area of self-propelled vehicles.

Still another object of the invention is to provide an operable, easily controllable windshield deicer for self-propelled vehicles and the like, which is adapted to utilize the waste heat energy of such vehicle.

Other objects and advantages of the present invention will become apparent from the following description taken in connection with the accompanying drawings, in which—

Fig. 1 is a perspective view of a preferred embodiment of my invention as mounted on a self-propelled vehicle;

Fig. 2 is a section taken on line 2—2 of Fig. 1;

Fig. 3 is a fragmental sectional view of a portion of the embodiment, as shown in Fig. 1; and Fig. 4 is a sectional view of an alternate form of a portion of the embodiment shown in Fig. 1.

Referring now to the drawings in which like reference characters denote like parts throughout, a preferred embodiment of my invention is shown in connection with an automotive vehicle 10. In accordance with my invention as applied, for example, to an internal combustion engine 10', the exhaust gases of such engine 10' are utilized by connection, to the exhaust manifold line 11 of said engine, of a Y tube 12. Branch 13 of said Y tube 12 is connected to the muffler line of the vehicle engine while the other branch 14 of said Y tube is connected to a tube or conduit 15 extending from under the hood 16 of said vehicle to the outside of said hood and which is connected to gas conductor tube or piping 17, preferably of reduced size, which is disposed and secured to the marginal area of windshield 18 of said vehicle by means of a plurality of spaced securing posts 19 and 20 which extend from the roof 21 of the vehicle.

It is to be noted that said exhaust gas conductor tube 17 disposed along the frame of the windshield 18 is preferably of polygonal shape. Furthermore, said conductor 17 is disposed and spaced outwardly of said windshield area to prevent the gases in the conductor from injuring the glass or the frame while, at the same time, throwing sufficient heat upon the windshield area to melt any sleet or snow or ice which forms on the windshield when the deicer is not in use.

Said conductor 17 is provided with a continuing extension 22 which passes under the hood 16 of said vehicle 10 preferably alongside of the area below the engine 10' of the vehicle so as to permit the exhaust gases to escape into the air as the vehicle is moving or through a supplemental muffler, not shown. The Y tube 13 which interconnects the exhaust, muffler and windshield lines contains a two-way butterfly valve 23, as shown in Fig. 3. Said valve has a spring member 24 which is connected to an enclosed cable 25 extending from said Y tube to the instrument dash panel or board 26 of the vehicle and which is operated by a push and pull button 27 in said panel, in order to divert the flow of gases from the exhaust to either the gas conductor 17 or through piping 28 leading to the muffler of the vehicle.

Instead of the construction shown in Fig. 3 I may use the construction shown in Fig. 4. In said modification, I provide an extension 29 in Y tube 12, which tapers into a nozzle 30. The wider portion of said nozzle 30 is connected to conduit 15 in any suitable manner. It is to be noted that said conduit has a plurality of perforations or openings 31 in its periphery pref erably disposed below the nozzle area 30 so that, when the exhaust gases escape through branch 14 of Y tube 12, air from the atmosphere enters into conduit 15 through said openings 31. By this modification there is an admixture of air with the hot gases so as to reduce the temperature of said gases and thereby prevent blistering of the paint adjacent the gas conductor on the vehicle.

It will be noted that my invention, as described and shown herein, can be connected to the exhaust line of any type of engine of a self-propelled vehicle or unit containing a windshield for permitting the operator of the vehicle to see through even when it is snowing or when sleet or ice is forming. The windshield wipers of the vehicle, when the windshield is kept warm by the gas conductor around the windshield, very easily remove any liquid forming on the windshield. Furthermore, my invention can be easily installed without materially changing the structure of the engine or of the chassis of the self-propelled vehicle. The invention has been described in connection with an automobile. However, it is to be noted that it can be used in connection with other vehicles such as steam locomotives, or ships, where the steam can be utilized.

While a preferred embodiment of my invention has been described and shown herein, it is understood that certain modifications as to form, use and arrangement of parts may be made without departing from the spirit and scope of my invention, as claimed.

I claim:

Deicing apparatus for the windshield of an automotive vehicle, comprising a Y tubular member extending from the exhaust line of the engine of said line, and having a plurality of extensions, a gas conducting line having a perforated portion communicating with one of the extensions of said tubular member and extending around the margin of the windshield area of the vehicle and opening to the atmosphere at a position below the windshield area, another conduit leading from the other of the extensions of the tubular member to the muffler line of said vehicle, said tubular member having an operable butterfly valve, to divert the flow of exhaust gases from the exhaust line into either the muffler line or the gas conducting line, and means extending from the butterfly valve to the vehicle dashboard for actuating the valve to selectively divert the gas from the exhaust line to the gas conducting and muffler lines, said tubular member having a restricted nozzle in its gas conducting line above the butterfly valve to permit admixing of air with the exhaust gas as it passes around the windshield area.

EDWARD T. DUNCAN.

REFERENCES CITED

The following references are of record in the file of this patent:

UNITED STATES PATENTS

| Number | Name | Date |
| --- | --- | --- |
| 1,485,718 | Ryan | Mar. 4, 1924 |
| 1,767,446 | Graham | June 24, 1930 |
| 1,921,519 | Gauger | Aug. 8, 1933 |